Sept. 10, 1968  M. H. TUFT  3,400,526
HARVESTER REEL CONSTRUCTION
Filed Oct. 19, 1965  3 Sheets-Sheet 1

MILES H. TUFT
INVENTOR.

BY

P. F. Hilden
ATTORNEYS

Sept. 10, 1968    M. H. TUFT    3,400,526
HARVESTER REEL CONSTRUCTION
Filed Oct. 19, 1965    3 Sheets-Sheet 2
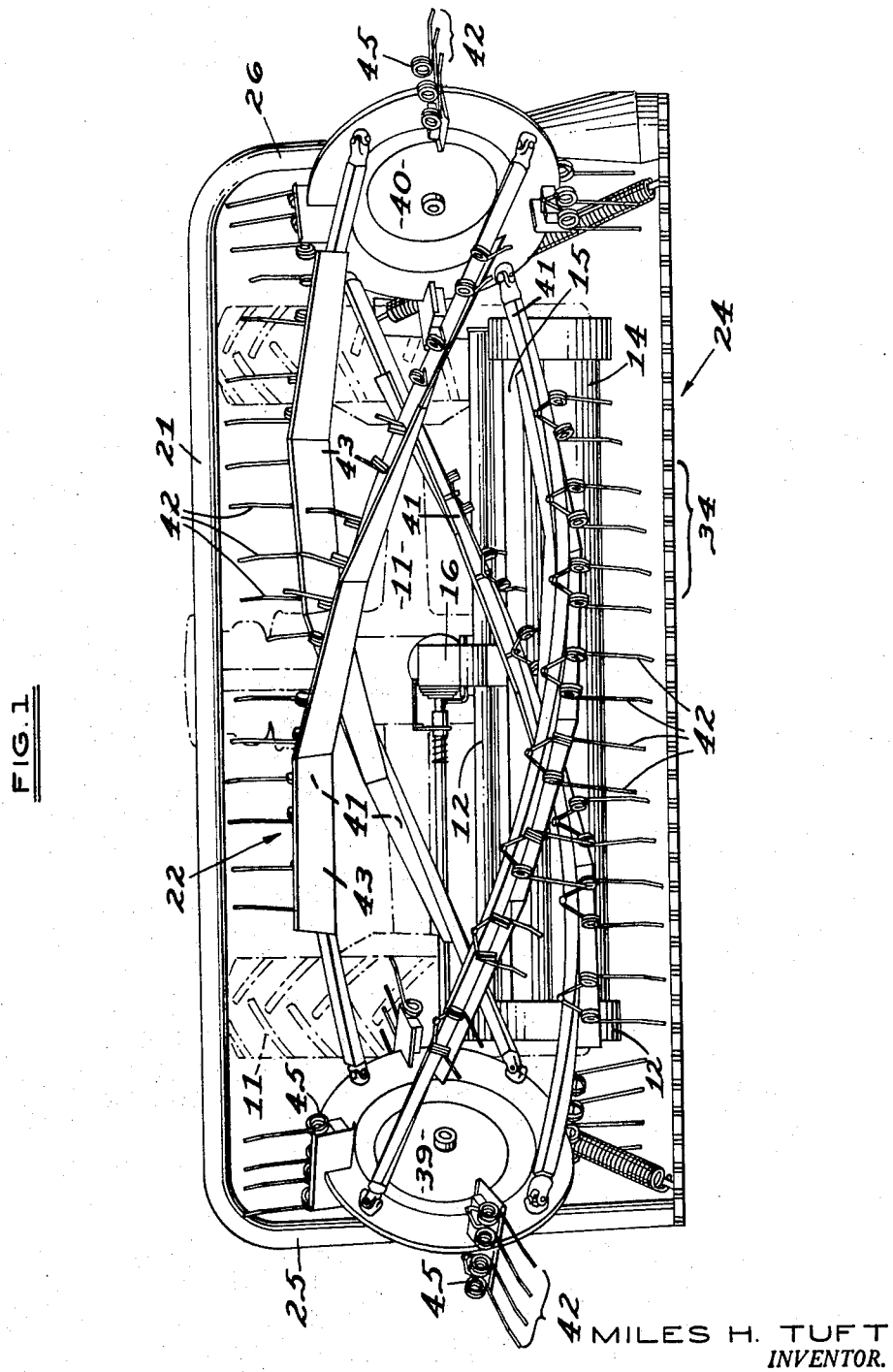
MILES H. TUFT
INVENTOR.
BY
P. F. Hilder
ATTORNEYS

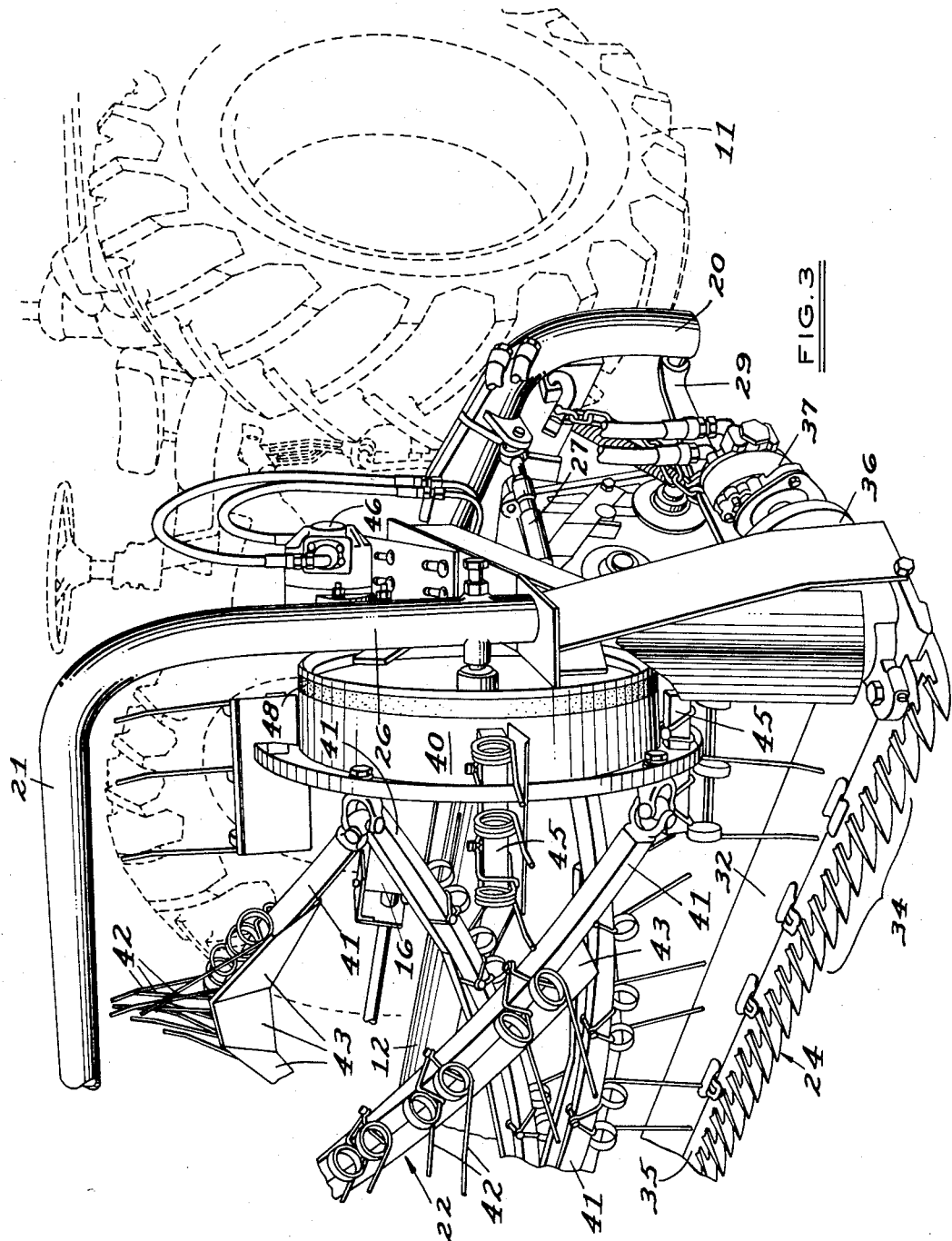

3,400,526
HARVESTER REEL CONSTRUCTION
Miles H. Tuft, Birmingham, Mich., assignor to Ford Motor Company, Dearborn, Mich., a corporation of Delaware
Filed Oct. 19, 1965, Ser. No. 497,795
8 Claims. (Cl. 56—220)

This invention relates to harvester reels of the type used in grain and hay headers.

In the harvesting of crops, the header or forward portion of the machine often is provided with a sickle bar type of cutter and a reel mounted for revolution on an axis located generally above the cutter, the reel serving to sweep the cut crop rearwardly from the cutter bar to prevent clogging of the cutter bar and to aid in feeding the crop for further processing, including hay conditioning, combining or the like. Conventional reels are provided with a pair of end plates mounted for rotation in parallel, vertical, fore-and-aft planes and connected by bars to move the crop straight rearwardly from the cutter bar. Frequently, an apron or other mechanism is provided for condensing the crop laterally for further processing.

In the present invention, an improved form of reel is provided which sweeps the crop rearwardly and, at the same time, condenses the crop laterally towards the center of the header, thus obviating the necessity of a separate mechanism for laterally condensing and permitting the mechanism for further treatment of the crop, e.g., hay conditioning rolls, to be substantially shorter than the cutter bar. In the form shown of the invention, this is accomplished by mounting the reel end plates in forwardly diverging vertical planes and by using a novel form of bar connecting the two end plates and mounting a short auxiliary bar on the end plates for sweeping the crop from the very ends of the cutter bar.

The machine also embodies an improved floating mounting stabilizing the header against sidesway.

Among the objects of the present invention are to provide an improved form of harvester reel for use in conjunction with a cutter bar; to provide such a reel which will laterally condense the crop as it moves it rearwardly; to provide such a construction which is durable and dependable in use; and generally to improve harvester reels of the type described.

Other objects, and objects relating to details and economies of construction and use will be more apparent from the detailed description to follow.

My invention, is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming a part of this specification in which:

FIGURE 1 is a front elevation of a harvester embodying a reel according to the present invention. The harvester is shown mounted on a tractor, a portion of which is indicated in broken lines.

FIGURE 3 is a perspective view of one end portion of the harvester, a portion of the tractor upon which the harvester is mounted being shown in broken lines.

Figure 2:
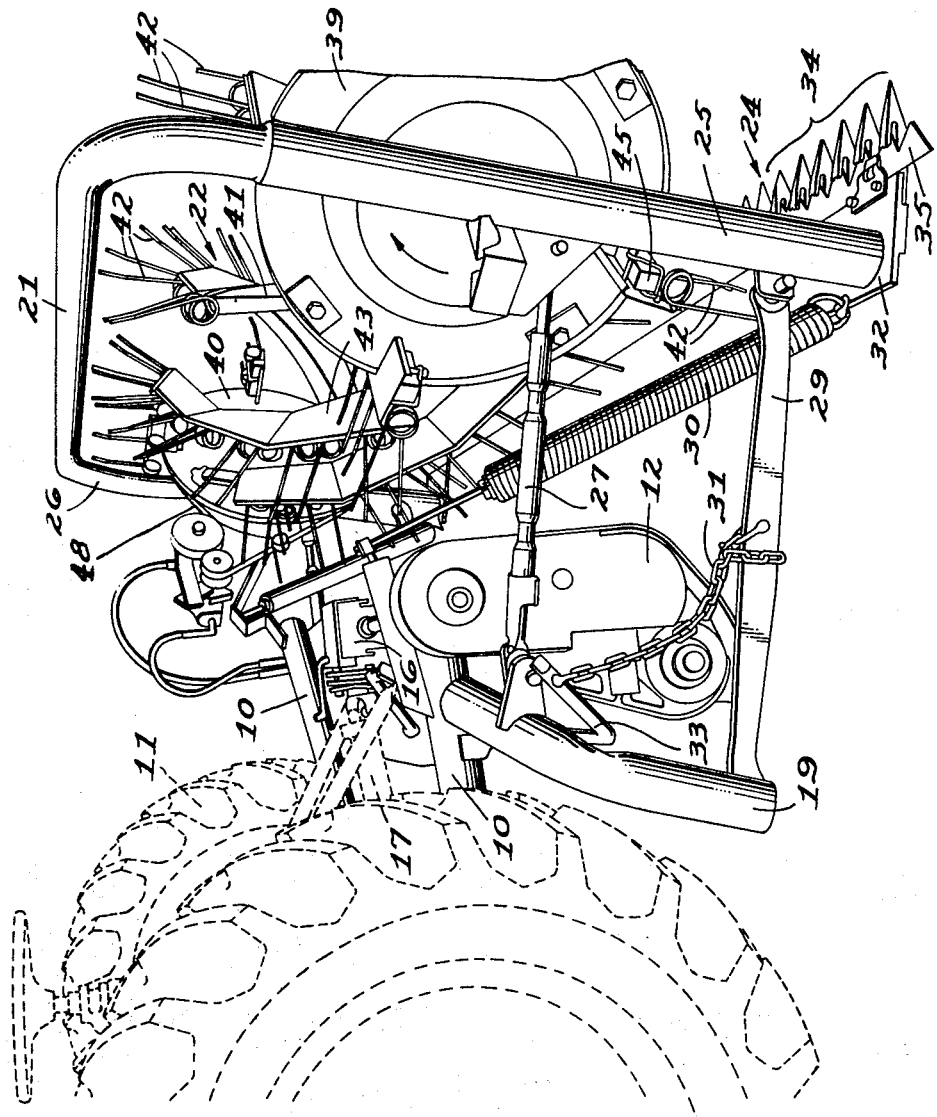
FIGURE 2 is a side perspective view of the harvester shown in FIGURE 1, a portion of the tractor upon which the harvester is mounted being shown in broken lines.

Referring now to the drawings, the harvester of the present invention includes a main frame 10 which is fixed to the frame of a tractor 11. The precise manner of attachment of the frame 10 to the tractor is immaterial. In the organization shown in the drawings, the harvester is shown used with a hay conditioner 12 for further treating the cut crop. To better support the weight of the unit, including the hay conditioner, and to drive the hay conditioner from the tractor P.T.O. shaft (not shown), the tractor may be reversed as indicated in the drawings, the drive wheels of the tractor being of larger size and diameter to better support the load and the driving position on the tractor being reversed.

The hay conditioner 12 is supported on the outer end of the main frame 10. This conditioner consists of a pair of counterrotating, horizontally extending rolls 14 and 15 for crushing and bruising the crop therebetween to facilitate field drying. A hay conditioner of this general type is shown in U.S. Patent 2,711,622, issued to A. R. Cunningham.

The hay conditioner 12 is provided with a gearbox 16 driven from the P.T.O. shaft of the tractor by a drive shaft 17. The final drive to the rolls 14 and 15 may be generally as indicated in the above-mentioned patent.

A pair of laterally extending frame arms 19 and 20 extend from the main frame 10 for supporting an arched frame 21 upon which a rake reel 22 and a cutter bar 24 are supported. The frame 21 extends above the rake reel 22 and has downwardly projecting ends 25 and 26 supporting the rake reel and cutter bar.

The frame 21 is supported from the main frame arms 19 and 20 by upper and lower links 27 and 29 at each side of the frame. As best shown in FIGURE 2, each link 27 and 29 is pivotally connected between the frame arms 19 and 20 and the ends 25 and 26, respectively, of the frame 21. A low-rate spring 30 extending between the outer end of the main frame 10 and each end of the cutter bar 24 adjacent its attachment to the ends 25 and 26 of the frame 21 carries the weight of the frame 21 from the main frame 10. Preferably, a chain 31 extending between an arm 33 fixed to the frame arms 19 and 20 and each lower link 29 limits downward movement of the frame 21.

The cutter bar 24, which is of the sickle bar type comprises a bar 32 extending between the ends 25 and 26 of the frame 21 and carrying spaced guards 34 along its forward edge. A cutter bar knife 35 is mounted for reciprocation along the bar 32, and a knife drive mechanism 36, which may be similar to that shown in U.S. Patent 3,180,073 to M. H. Tuft, drives the knife. The drive mechanism 36 may, in turn, be driven by a hydraulic motor 37 driven by hydraulic fluid. Preferably, the cutter bar 24 extends in front of the ends 25 and 26 of the frame 21 and cuts for its entire length.

The rake reel 22 comprises a pair of reel end plates 39 and 40 lying in forwardly divergent vertical planes and mounted on the ends 25 and 26 of the frame for rotation about axes perpendicular to the planes of the reel plates. The reel end plates 39 and 40 are connected by a series of rake bars 41 extending between the reel plates and having a series of rake teeth 42 mounted thereon, the rake teeth being generally conventional. Shields 43 extend along each rake bar 41 to prevent wrapping of the cut crop about the rake bars.

Instead of being straight, as in conventional rake reel constructions, each of the rake bars 41 is of helical form and is attached to the periphery of the reel end plates 39 and 40 at diametrically opposite locations. The rake bars are mounted about the peripheries of the reel end plates 39 and 40 at equal intervals, the ends of the rake bars being fixed to the end plates by universal joints 44. Inasmuch as each rake bar is connected between the reel end plates 39 and 40 at diametrically opposite points of the reel end plates, there is substantially constant length between the attaching points of each rake bar 41 to the reel end plates as they are rotated, so that the rake bars may be made a fixed length and need not telescope. Due to its helical form, each rake bar 41 will extend halfway about the cylindroid generated by the rotation of the rake reel 22.

The rake teeth 42, which extend generally radially of the reel 22, move rearwardly closely above the cutter bar 24 so as to sweep rearwardly from the cutter bar the crop cut thereby. Due to the forwardly divergent planes in which the reel end plates 39 and 40 lie and the helical form of the rake bars 41, the rake teeth 42 will move across the cutter bar, not in a rearward direction at right angles to the cutter bar, but in rearwardly converging paths, these paths converging at the line formed by the intersection of the planes of the reel end plates. Midway of the cutter bar, the paths of the rake teeth will be directly to the rear and the forward divergence of the paths of the rake teeth will increase towards the outer ends of the cutter bar. This results in converging the crop centrally as it is moved rearwardly from the cutter bar 24.

In order to more completely sweep the cut crop from the ends of the cutter bar 24, additional rake teeth 42 may be carried directly on the reel end plates 39 and 20. These rake teeth preferably are carried on short rake bars 45 mounted at the periphery of each of the reel plates midway between the rake bars 41. The bars 45 extend perpendicular to the planes of the reel end plates 39 and 40 and, preferably, project on both sides of that plane. The rake bars 45 serve to sweep crop from the extreme ends of the cutter bar.

The rake reel 22 is driven by a hydraulic motor 46 driven by hydraulic fluid from the tractor and mounted on the frame 21 through a V belt extending about the reel end plate 40. The reel end plate 39 is driven from the end plate 40 by means of the rake bars 41, in accordance with usual practice.

I claim:

1. A reel for harvesters, said reel having a pair of reel end plates lying in forwardly divergent vertical planes, a series of bars extending between the end plates and attached to said end plates at spaced intervals, and rake teeth mounted on the bars, each bar having a generally helical form and attaching to the two end plates at diametrically opposite attaching points.

2. A reel for harvesters, said reel having a pair of reel end plates lying in forwardly divergent vertical planes, a series of fixed-length bars extending between the end plates and attached to said end plates at spaced intervals, and rake teeth mounted on the bars, each bar having a generally helical form and attaching to the two end plates at diametrically opposite attaching points.

3. A reel for harvesters, said reel having a pair of reel end plates lying in forwardly divergent vertical planes, each end plate being mounted for rotation about a central axis perpendicular to the general plane of the plate, a series of bars extending between the end plates and attached to said end plates at spaced intervals, and rake teeth mounted on the bars, each bar having a generally helical form and connected to the two end plates by universal joints at diametrically opposite attaching points.

4. A reel for harvesters as claimed in claim 3, in combination with a sickle bar cutter, the reel being mounted immediately over the cutter whereby the rake teeth sweep over the cutter in rearwardlf converging paths to laterally condense a crop severed by the cutter.

5. A reel for harvesters, said reel having a pair of reel end plates lying in forwardly divergent vertical planes, each end plate being mounted for rotation about a central axis perpendicular to the general plane of the plate, a series of bars extending between the end plates and attached to the periphery of said end plates at spaced intervals, rake teeth mounted on the bars, and rake teeth carried by and projecting radially from the end plates.

6. A reel for harvesters as claimed in claim 5, in which the rake teeth carried by the end plates are located between the attaching points of the bars.

7. A reel for harvesters as claimed in claim 6, in which the rake teeth carried by the end plates are mounted on short bars rigidly attached to and projecting perpendicularly to the plane of the end plates.

8. A reel for harvesters as claimed in claim 7, in which the short bars project from both faces of the reel plates.

References Cited

UNITED STATES PATENTS

| 2,910,819 | 11/1959 | Helliwell | 56—220 |
| 3,319,408 | 5/1967 | Landwehr | 56—220 |

FOREIGN PATENTS 101,009  10/1962  Norway.

ANTONIO F. GUIDA, *Primary Examiner.*